March 25, 1941.  V. P. HAAS  2,236,428
VEHICLE LUGGAGE CASE
Filed May 31, 1939  2 Sheets-Sheet 1
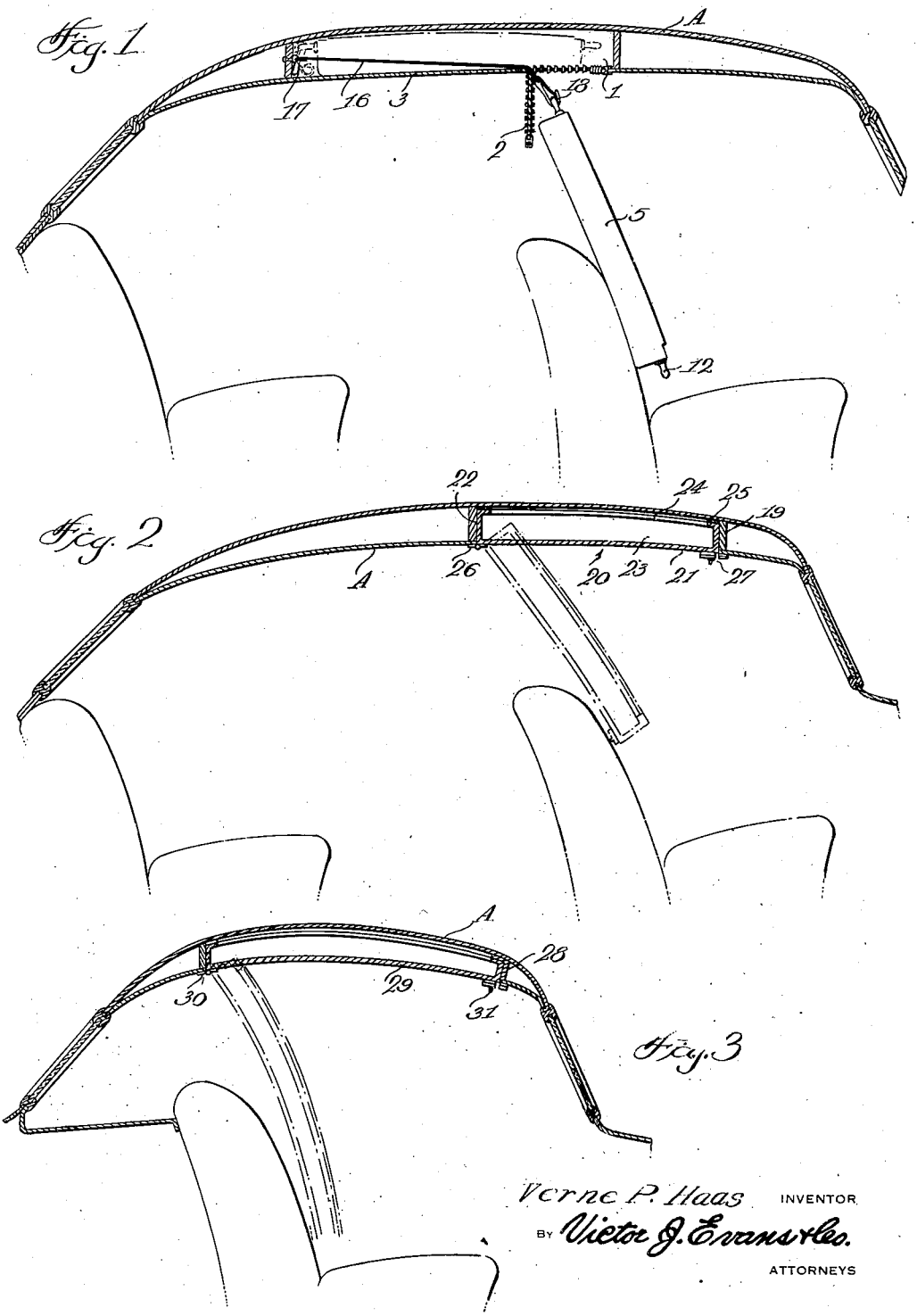
Verne P. Haas  INVENTOR
BY Victor J. Evans & Co.
ATTORNEYS March 25, 1941. V. P. HAAS 2,236,428
VEHICLE LUGGAGE CASE
Filed May 31, 1939 2 Sheets-Sheet 2
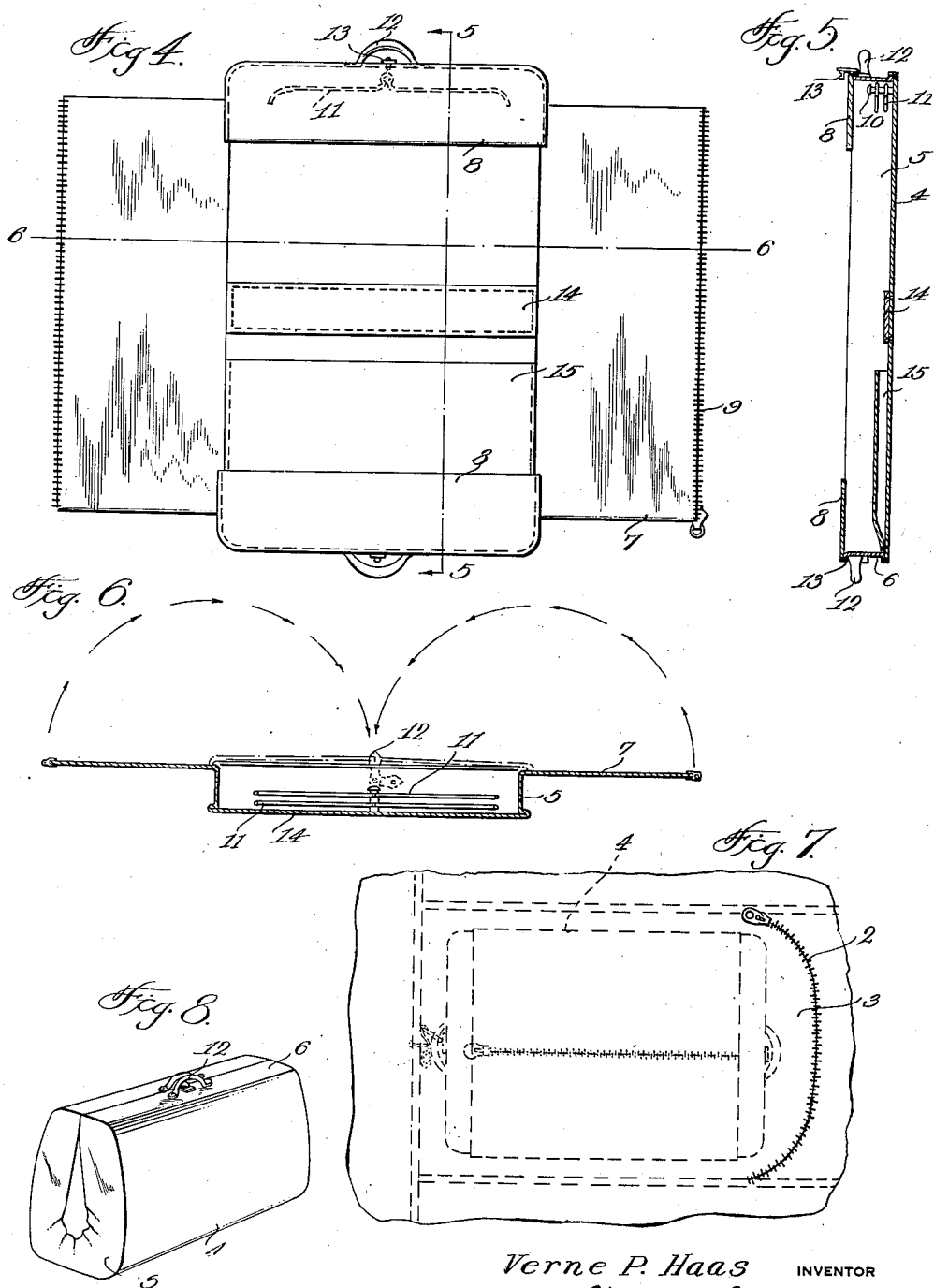
Verne P. Haas INVENTOR
BY Victor J. Evans & Co.
ATTORNEYS

Patented Mar. 25, 1941

2,236,428

UNITED STATES PATENT OFFICE 2,236,428

VEHICLE LUGGAGE CASE

Verne P. Haas, Silverpeak, Nev.

Application May 31, 1939, Serial No. 276,707

2 Claims. (Cl. 296—37)

This invention relates generally to luggage cases, and its main object is to provide a case for receiving garments and the like, to be carried within the upper portion of a motor vehicle with respect to the top thereof, the top having a compartment therein designed for fittingly receiving the case, so as to retain the same in an out of the way position, yet ready access may be had thereto with minimum effort on the part of the user, and the case may be attached within the compartment for removal or partial removal therefrom, for disposal in an inclined bridging relation between the compartment and the back of a seat of the vehicle, to rest upon the back, so that garments and the like can be applied and removed with respect to the case in an easy and expeditious manner.

A further object is to provide a compartment carried luggage case for motor vehicles, for receiving garments and the like whereby ready access may be had thereto, yet they are retained free from dirt, dust and foreign matter and the case can be in the form of a tray hinged within the compartment, or in the form of a bag detachably connected with respect to the compartment so as to be entirely removed therefrom, so that it can be carried from place to place, such as for instance within a hotel or the like.

Another object is to provide a garment case in the form of a tray that is permanently attached to the vehicle and acts as a closure for the case receiving compartment, the case being hinged within the compartment and suitable latching means is provided for securing the same in closed position.

A further object is to provide a compartment carried luggage case in the form of a bag detachably connected with respect to the vehicle for removal from its compartment and the bag is preferably made from flexible material into substantially flat elongated rectangular formation to fit its compartment and is capable of being flolded midway its ends, as well as has handles secured to the ends thereof, so that the case can be conveniently carried in the same manner as an ordinary suitcase, bag or the like.

Another object is to provide a compartment carried luggage case in the form of a bag of the character set forth, for garments such as suits, dresses and the like, that can be packed therein with minimum folding, thereby preventing wrinkling and improper creasing thereof, and the bag includes hangers for the garments.

A still further object is to provide a luggage case together with a compartment within a vehicle for fittingly receiving the same, that is simple in construction, inexpensive to manufacture, easy to install within the vehicle, and extremely efficient in operation, use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a view taken through the body of a motor vehicle and illustrates one form of my invention, with the case thereof disposed within its compartment in dotted lines and removed therefrom in full lines.

Figure 2 is a similar view of a modified form.

Figure 3 is also a similar view of a further modified form.

Figure 4 is a top plan view of the bag form of my case as illustrated in Figure 1, with the case in open position.

Figure 5 is a sectional view taken approximately on line 5—5 of Figure 4, looking in the direction of the arrows.

Figure 6 is a sectional view taken approximately on line 6—6 of Figure 4, looking in the direction of the arrows, and with the closure flaps of the case in open position in full lines and closed in dotted lines.

Figure 7 is a fragmentary view looking toward the compartment within the top of the vehicle of the form of Figure 1 and illustrates the case in dotted lines together with the means for detachably connecting the same within the compartment.

Figure 8 is a perspective view of the bag form of case removed from its compartment and folded in a position to be carried by hand, from place to place.

Referring to the drawings in detail, and particularly to Figures 1 to 3 inclusive, which illustrates the various forms of my invention, the letter A indicates a motor vehicle top of the usual construction, that is it includes a roof and a ceiling spaced from the roof. Within the space between the ceiling and roof, I provide a compartment including walls of any material suitably secured to each other and to the usual braces, the latter being rearranged to accommodate the compartment.

In the form of Figure 1, the compartment is indicated by the reference numeral 1 and the ceiling is of any suitable heavy flexible material covering the compartment to provide a closure for the bottom thereof, while the upper portion is closed by the roof. The closure portion of the ceiling is cut or slit preferably in arcuate formation transversely and adjacent to the forward end of the compartment to provide an opening therefor, and a slide fastener 2 is provided for closing the opening, as best shown in Figure 7. The closure portion which for distinction is indicated by the reference numeral 3 is secured to the walls of the compartment, so that said portion will amply support the weight of the case, without undue sagging as will be apparent. Screws or like means may be provided for that purpose.

The case of the form as shown in Figure 1, is clearly illustrated in Figures 4 to 8 inclusive from which it will be noted that it is in the form of a bag of substantially flat elongated rectangular formation made from flexible material suitable for the purpose, such as leather or the like, to provide a bottom wall 4, narrow side and end walls 5 and 6 and the front wall is made up of closure flaps 7, as well as includes end sections 8 secured to the end walls and adjacent portions of the side walls, as will be obvious upon inspection of Figures 4 and 5. The closure flaps are formed on the side walls and are of a length for disposal in overlapped association with the end sections 8, when in closed position, and are held accordingly by a slide fastener 9 secured along the outer edges thereof, with the result it will be obvious that when the closure flaps are in closed position, as shown in dotted lines in Figure 6, that the case is rendered dust proof and the flaps are preferably of equal width so that the outer edges thereof extend along the longitudinal center of the bag when they are in closed position.

Secured to the rear wall adjacent one end thereof is a headed stud 10 or other like means having mounted thereon garment hangers 11 which as shown are preferably formed from a single strand of wire looped upon itself midway its ends to provide an eye disposed about the stud, as best shown in Figure 4. Each of the end walls 6 have secured thereto midway their ends handles 12 of the usual bail type, in the form as shown, to facilitate carrying the bag, when the latter is removed from its compartment and folded, as shown in Figure 8. In order to hold the bag in folded position, I provide suitable latching means 13 that includes companion members secured to the end walls.

The bag is preferably reinforced along the transverse center of the rear or bottom wall by a strip 14 that is sewed or otherwise secured to the inner surface of said wall, as best shown in Figure 5, so that when the bag is folded upon itself as shown in Figure 8, that portion of the rear wall that is reinforced will be flat, so that the bag will be self-supporting in an upright position, as shown in Figure 8. I also preferably provide a pocket 15 within the bag and such is shown as being a sheet of material sewed to the rear or bottom wall 4, with one edge left free, as clearly shown in Figure 5.

The bag form of case is detachably connected with respect to its compartment 1 by a strap 16 that has one end fastened to the rear wall of the compartment through the medium of an eyed member 17 and its opposite end has a safety hook 18 connected thereto for receiving either one of the handles 12. The strap is of a length to suspend the bag with respect to the back of a seat of the vehicle, as shown in Figure 1, and when in set position, the bag can be easily opened and closed and garments or the like conveniently applied or removed with respect thereto.

Now referring to the form of Figures 2 and 3, it will be noted that the forms of those figures are substantially identical, the only difference being that one form is for a two seated vehicle as shown in Figure 2, and the form of Figure 3 is for a one seated vehicle, but both of the forms differentiate considerably from the forms of Figures 1 and 4 to 8 inclusive, in that the case of the forms of Figures 2 and 3 is in the form of a tray, preferably made from rigid material, as distinguished from the flexible material used in the construction of the bag form.

In Figure 2, the reference numeral 19 indicates the compartment which is likewise made up of walls and the case 20 which is shaped for fitting association with the compartment 19 includes a bottom wall 21 and side and end walls 22 and 23 respectively. The upper edges of the side and end walls have formed thereon an inturned marginal flange 24 that preferably has secured thereto on the outer surface thereof a gasket 25 formed from rubber or other suitable material for engagement with the roof to render the case leak proof, as will be apparent. The case or tray 20 is shown as being permanently associated with its compartment, and for that purpose I provide hinges 26 therefor connecting the rear end of the bottom wall with the rear wall of the compartment. When the case or tray 20 is in open position, as shown in dotted lines in Figure 2, it likewise rests upon the back of the front seat, so that garments and the like can be readily applied and removed with respect thereto, and the case is held in closed position by the latching means 27 including companion members secured to the front end of the bottom wall and the front wall of the compartment.

In Figure 3, the compartment is indicated by the reference numeral 28, and the case or tray by the numeral 29 which is likewise hingedly connected as at 30 for movement into and out of its compartment and is held therein or in closed position by latching means 31. The case or tray of this form also has an open upper portion provided with a marginal flange having a gasket secured thereto for engagement with the roof of the vehicle, as shown.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. In a motor vehicle including a top having a roof and a ceiling, fixed walls between the roof and ceiling and providing a compartment within said top, said ceiling covering the bottom of the compartment and providing a closure therefor, the closure being slit transversely adjacent to one end of the compartment to provide access means for the compartment, fastening means for the access means for holding the same closed, a luggage receiving case carried within said compartment, and means connecting one end of said case to the rear end of the compartment for holding the case suspended from the compartment when removed therefrom and for supporting said case for the latter to rest upon the back of a seat of the vehicle at an inclination to facilitate application and removal of luggage with respect to said case.

2. In a motor vehicle including a top having a roof and a ceiling, fixed walls between the roof and the ceiling and providing a compartment within the top, said ceiling covering the bottom of the compartment and providing a closure therefor, the closure being slit in arcuate formation transversely adjacent to one end of the compartment to provide access means for the compartment, slide fastening means for the access means for holding the same closed, a luggage receiving case carried within said compartment, a strap having one end connected within the compartment, means for detachably connecting the case to the opposite end of the strap for the latter to support the case suspended from the compartment when removed therefrom with the case resting upon the back of a seat of the vehicle at an inclination to facilitate the application and removal of luggage with respect to said case.

VERNE P. HAAS.